April 7, 1959 A. F. FENTON ET AL 2,881,245

PHASE SHIFTING CIRCUITS FOR COLOR TELEVISION RECEIVER

Filed April 30, 1956 2 Sheets-Sheet 1

INVENTORS
Gordon E. Kelly
& Andrew E. Fenton
BY
[signature]
ATTORNEY

April 7, 1959 A. F. FENTON ET AL 2,881,245

PHASE SHIFTING CIRCUITS FOR COLOR TELEVISION RECEIVER

Filed April 30, 1956 2 Sheets-Sheet 2

INVENTORS
Gordon E. Kelly
& Andrew F. Fenton
BY
ATTORNEY 2,881,245

PHASE SHIFTING CIRCUITS FOR COLOR TELEVISION RECEIVER

Andrew Francis Fenton, Merchantville, and Gordon Emmet Kelly, Haddonfield, N.J., assignors to Radio Corporation of America, a corporation of Delaware Application April 30, 1956, Serial No. 581,794

5 Claims. (Cl. 178—5.4)

The invention relates to circuit arrangements for shifting the phase of a continuous wave, and it particularly pertains to such circuit arrangements for manually adjusting the hue of a televised image reproduced in full color.

The composite color signal broadcast in accordance with U.S. standards, set forth in Federal Communications Commission public notice No. 53–1663, of December 17, 1953, comprises deflection synchronizing pulses, luminance and chrominance signals, and color bursts. The deflection synchronizing pulses are used to control the scanning of the electron beam forming the raster on the face of the kinescope in synchronism with the scanning of the electron beam in the color television camera. The luminance signal is intended to have exclusive control of the luminance of the reproduced image and corresponds to the present black-and-white, or monochrome, signal. The chrominance signal is constituted by its side bands of a phase- and amplitude-modulated sub-carrier wave of frequency corresponding to one of the higher luminance video signal frequencies. The demodulated chrominance signal consists of color difference signals which when added to the luminance signal will be effective to reproduce the televised image in full color. The color difference signals are derived from the chrominance signal by synchronous detection, that is, by heterodyning or mixing the chrominance signal with a color reference signal of phase relationship in accordance with the color difference signals to be derived. The color bursts, which comprise a few cycles of sine wave of color subcarrier frequency, follow the horizontal deflection synchronizing pulses during the blanking interval and are employed for establishing the phase of the color reference signal. Without such color bursts, the chrominance subcarrier demodulation process will not take place in the proper phase relationship and the hue of the reproduced image will not correspond to that of the image as generated. It is frequently desirable, however, to be able to adjust the hue of the image as reproduced on the kinescope to overcome phase distortion of the image signals in transmission, or merely for reasons of personal taste.

Hue adjustment may be provided according to prior art teachings by connecting a variable capacitor across one or more circuits in which the color reference signal is generated and shifting the phase of the generated signal over a small angular range. A variable capacitor for such tuning is relatively expensive and usually must be so located with respect to the operating panel of the television receiver that expensive mechanical coupling must be employed to make the adjustment convenient to the televiewer.

An object of the invention is to provide an improved circuit arrangement for conveniently adjusting the hue of the image reproduced by a color television receiver.

Another object of the invention is to provide an inexpensive hue controlling circuit arrangement for easy operation by the televiewer.

The phase of a color reference signal is shifted over a suitable angle to vary the hue of the image reproduced in full color according to the invention by a resistance-capacitance network comprising a pair of capacitive reactance elements connected in series across a circuit tuned to the color reference signal and a variable resistive element connected for direct current flow across one of the capacitive elements. The variable resistive element may be located at any convenient point on the television receiver chassis by using a length of shielded cable for connecting the resistance and capacitance elements in parallel; the shunt capacitance of the cable supplying a portion, if not all, of the capacity of the one capacitive element. Suitable characteristics of the control may be afforded by a fixed resistance device connected to the variable resistance element and by special construction of the variable resistance element itself.

In order that the invention may be fully appreciated and the advantages thereof readily obtained in practice, express embodiments of the invention are described hereinafter with reference to the accompanying drawing in which.

Figures 1, 2:
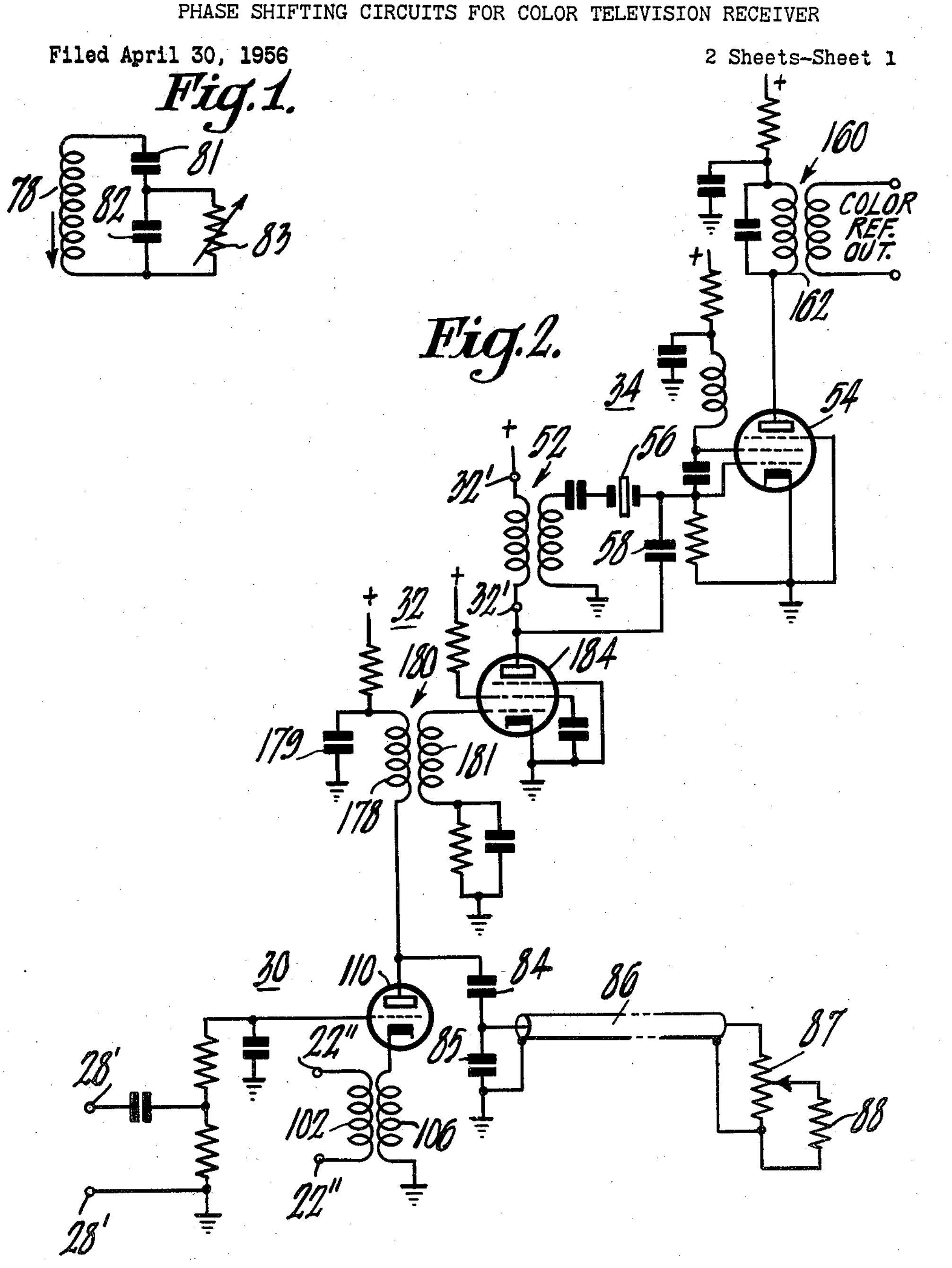
Fig. 1 is an equivalent diagram of a color television receiver hue control according to the invention.
Fig. 2 is a schematic diagram of an embodiment of the invention for shifting the phase of a color reference signal for application to a chrominance signal demodulating circuit.

The invention is applicable to practically any color television receiver, and which receiver may otherwise comprise entirely conventional circuitry. In such a receiver, color television signals appearing at an antenna are amplified, heterodyned down to a lower intermediate frequency for additional amplification and demodulated. Frequency modulation sound signals are derived from the foregoing circuitry for further processing in an aural discriminating circuit, amplified and applied to a sound reproducer transducer, usually in the form of a speaker. The composite color signal is applied to a synchronized pulse separating circuit to separate the synchronizing pulses from the picture signals and to separate the horizontal synchronizing pulses from the vertical. The separated synchronizing pulses are applied to deflection wave generating circuitry to control the generation of deflection waves which are amplified and applied to the kinescope electron beam deflection system. High voltage circuitry and convergence voltage circuitry are coupled to the deflection generating circuitry to develop the necessary energizing potentials for the kinescope. A low voltage power supply, normally connected to the local A.-C. power line, is arranged to furnish direct energizing potential to all circuits. Automatic gain control and automatic frequency control circuitry may be incorporated to supply control potentials to the desired ones of the circuitry previously mentioned. Normally, the R.-F. and I.-F. amplifying circuits are at least supplied with automatic gain control potentials.

The demodulated composite color signal is applied to a video frequency amplifying circuit and is applied, either directly or by way of a delaying circuit, to a luminance signal amplifying circuit for presentation to image reproducing device. The composite color signal is also applied to a bandpass chrominance signal amplifying circuit, from which the chrominance signal is applied to a chrominance signal demodulating circuit. A gating signal synchronized with the deflection synchronizing pulses is applied to a color burst gating and amplifying circuit to which the composite color signal obtained from the chrominance signal amplifying circuit is also applied.

The gated color burst is applied to a chrominance subcarrier frequency generating or color reference signal generating circuit from which one or more color reference signals required for demodulating the chrominance signal are obtained and applied to the chrominance signal demodulating circuit. Color difference signals derived in the chrominance signal demodulating circuit are applied to the tri-color kinescope for mixing with the luminance signal to reproduce the televised image in full color.

Ordinarily the locally generated color reference signal is of the same frequency and phase as the chrominance subcarrier, in order that the hue of the image reproduced by the image reproducing device be the same as the scene televised. There are times however when it is desirable to control the hue of the reproduced image. This may readily be done by shifting the phase of the color reference signal at the output of the color reference signal generating circuit.

Referring to Fig. 1 there is shown a circuit useful in explanation of the invention. An inductor 78 is shunted by a capacitive reactance network shown as comprising two capacitors 81, 82 connected in series. This parallel circuit may be tuned to a given frequency by varying the inductance of the inductor 78 or the capacitance of one or both of the series connected capacitors 81, 82 or both. A shift in phase of the energy applied to this resonant circuit may be effected by slightly detuning the resonant circuit from the frequency of the applied energy. A discussion of such tuning is given at pages 141–148 and elsewhere in the Radio Engineers Handbook, by F. E. Terman, first edition, published 1943 by McGraw-Hill Book Company. According to the invention detuning to effect a phase shift is accomplished by means of an adjustable resistance element 83 shunted across one of the series capacitors 82. When the resistance element 83 is adjusted for zero resistance only the capacitance of the other series capacitor 81 is effective whereas when the resistance element 83 is adjusted for infinite resistance the series combination of both capacitors 81, 82 is effective. The phase shift is directly proportional to the resistance value since all other component values are fixed. The values of the capacitors 81, 82 are chosen to provide the desired phase shift. It should be understood, that in many instances the distributed capacity of the inductor 78 will be insufficient to resonate the circuit at the desired frequency, in which case lumped capacity may be added by shunting a fixed capacitor across the inductor. This will allow the values of the series capacitors 81, 82 to be selected solely for providing the desired degree of phase shift. Since the resistance element 83 is connected across the capacitor 82 for direct current flow, the resistance element 83 may be located at considerable distance from the capacitor 82. The only factor that is important is that the resistance of the connection plus the resistance of the element 83 does not exceed the minimum resistance desired. According to the invention, a length of shielded cable is used to prevent the pickup of stray energy from adjacent circuits, and the shunt capacity of the shielded cable is made a part of the total capacitance afforded by the capacitor 82.

An example of an application of the circuit according to the invention to a color television receiver is shown in Fig. 2. A chrominance signal is applied at input terminals 22'' connected to the primary winding 102 of a bandpass chrominance signal transformer having a secondary winding 106 connected in the cathode circuit of a gating tube 110. Gating pulses obtained from the horizontal deflection wave generating circuit (not shown) in known manner are applied to terminals 28' coupled to the grid of the gating tube 110 so that only the color bursts appearing in the chrominance signal are permitted to appear across the primary winding 178 of a burst take-off transformer 180. The color bursts are induced in a secondary winding 181 of the transformer 180 and applied to the grid of a burst amplifying tube 184 forming a part of a burst amplifying circuit 32. The color bursts are injected into a color reference generating circuit 34 comprising a pentode oscillator tube 54 and a piezo-electric crystal 56 arranged in a locked-oscillator circuit. A color reference signal, generated in phase with the color bursts, is developed across the primary winding 162 of a color reference signal output transformer 160 for application to a chrominance signal demodulating circuit (not shown) of known form. An example of such circuitry is given in the copending U.S. patent application, Serial No. 577,348, filed April 10, 1956, by G. E. Kelly, for Phase Shifting Circuit Arrangements. The hue of the reproduced image will correspond to the hue of the scene televised as long as this phase relationship between the color bursts and the color reference signals is maintained. The hue may be adjusted as desired by the televiewer by shifting the phase of the color reference signal over a small angle. In order to prevent detuning the oscillator 34 of the color television receiver the phase relationship is altered at the burst take-off transformer 180. A pair of capacitors 84, 85 are connected in series between the ungrounded terminal of the burst take-off transformer primary winding 178 and a point of reference potential, shown as ground. A length of shielded cable 86 connects the terminals of the grounded capacitor 85 to the terminals of a potentiometer 87 which is preferably located at some convenient point on the operating panel of the television receiver. The capacitance of the cable 86 and the capacitance of the grounded capacitor 85 constitute the capacitance of the corresponding capacitor 82 in Fig. 1. In the circuit arrangement of Fig. 2 the primary circuit of the burst take-off transformer 180 is tuned to resonance by means of the shunt capacitor 179 and by means of the series connected capacitor 84 and the capacitor 85 with the capacitance of the cable 86 in shunt thereto. As much as two or three feet of shielded cable can be readily used in present day color television receivers. The capacitance and inductance of the burst take-off transformer circuit can be adjusted within very wide limits so that the length of shielded cable to be used is not a serious problem. A series resistor 88 is preferably interposed in the lead to the arm of the potentiometer 87. This resistor alters the phase change-rotation characteristic of the hue control, effectively providing a more uniform phase change over the range of the control. With the arrangement shown in Fig. 2 a phase change of plus or minus 40° is readily obtainable with negligible variation in amplitude in so far as the operation of the color demodulator is concerned. This range, of course, more than suffices for the hue control of a conventional color television receiver. Although not necessary under usual conditons, the circuit constants may be chosen to provide constant amplitude-phase shift for exacting conditions such as found in test and measuring apparatus.

Figure 3:
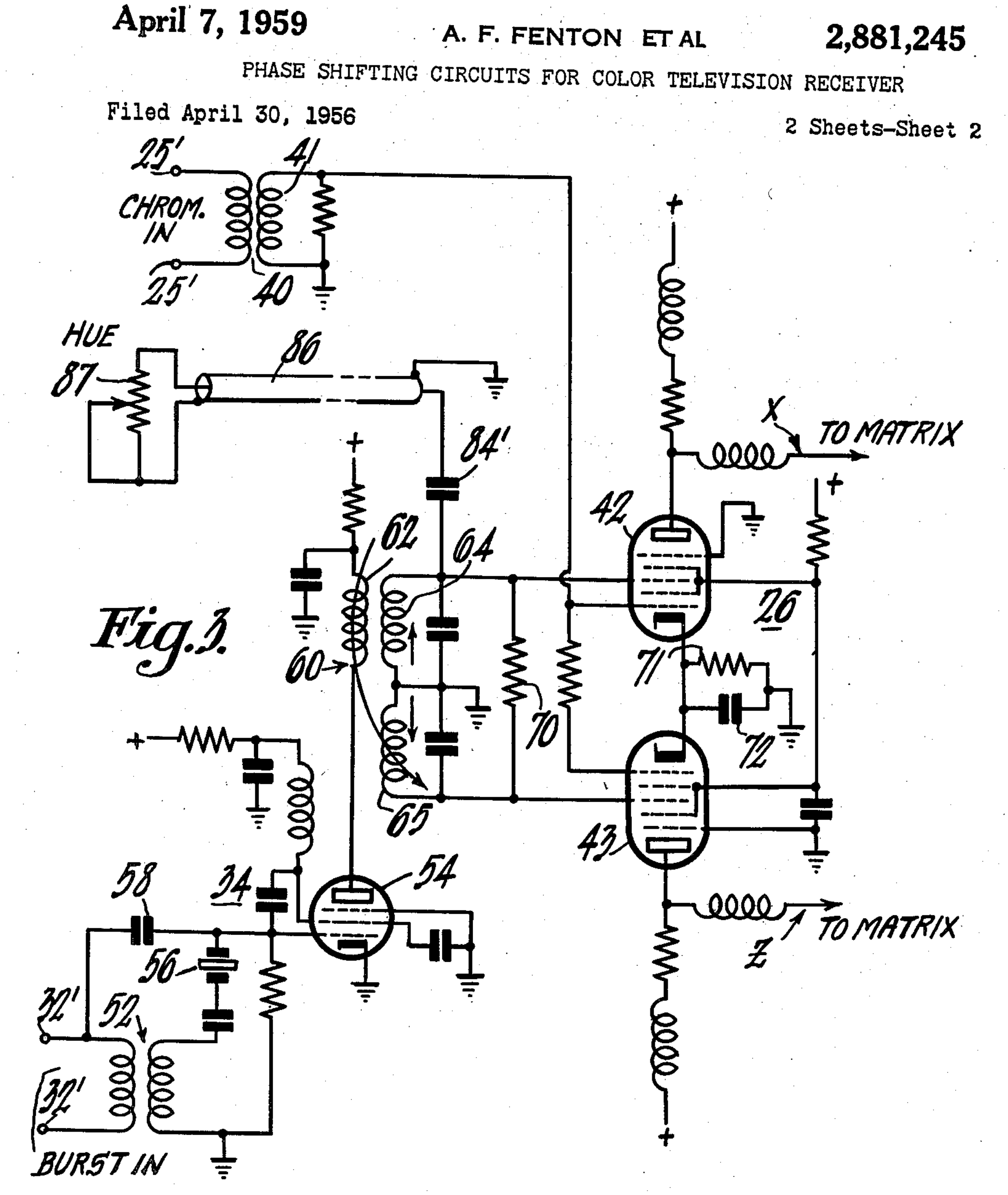
Fig. 3 is a schematic diagram of another embodiment of the invention.

Another example of an application of the invention to a color television receiver is shown in Fig. 3. The bandpass chrominance signal supplied to chrominance signal input terminals 25' and translated by means of a transformer 40 to the grid-cathode circuits of a pair of demodulating electron discharge devices, shown in the form of pentagrid converter tubes 42, 43 of the chrominance signal demodulating circuit 26. In accordance with known practice color reference signals are applied to the injection grid-cathode circuits of the demodulating tubes 42, 43 to produce X and Z signals at the anodes respectively. These color difference signals are then applied to a plurality of electron discharge matrix tubes (not shown) arranged to produce three color difference signals $(R-Y)$, $(G-Y)$, and $(B-Y)$.

Color reference signals of proper phase for application to the injection grid-cathode circuits of the demodulating tubes 42, 43 are obtained from a color reference signal generating circuit 34. Gated color bursts obtained by conventional means are applied to burst input terminals 32′ and translated by means of a coupling transformer 52 to the grid-cathode circuit of an electron discharge oscillator device 54. A piezo-electric crystal device 56 is interposed in the grid circuit of the oscillating tube 54. The crystal device 56 is adjusted to series resonance at the chrominance subcarrier frequency viewed from low side, thereby providing locked-in oscillator action. A neutralizing capacitor 58 is connected between the control grid of the oscillating tube 54 and one terminal of the primary winding of the burst coupling transformer 52 in order to eliminate the appearance of burst sideband energy at the grid of the oscillator tube. A color reference signal is developed nominally in phase with the received color burst across a primary winding 62 of a phase splitting transformer 60. The transformer 60 also comprises two secondary windings 64, 65 in which currents of the chrominance subcarrier frequency are induced by mutual coupling to the primary winding 62. One secondary winding 64 is connected between the cathode and the injection grid of the X demodulating tube 42 and the other secondary winding 65 is connected between the cathode and the injection grid of the Z demodulating tube 43. The secondary windings 64, 65 are tuned by means of adjustable capacitance elements or adjustable cores or both, so that the potentials on the injection grids are in a predetermined phase relationship. Further details of such circuitry may be found upon referring to the above mentioned copending U.S. patent application, Serial No. 577,348.

The hue may be adjusted as desired by the televiewer by shifting the phase of the color reference signal over a small angle. A capacitor 84′ is connected to the ungrounded terminal of the tightly coupled secondary winding 64. A length of shielded cable 86 connects the terminals of a hue controlling potentiometer 87, which is preferably located at some convenient point on the front panel of the television receiver between the capacitor 84′ and the point of reference potential shown as ground. The capacitance of the cable 86 constitutes the capacitance of the corresponding capacitor 82 in Fig. 1.

While those skilled in the art will determine the values of components to be used in a particular application of the invention, the pertinent values parts listed below are suggested as a guide to the practice of the invention.

| Ref. No. | Component | Type or value |
|---|---|---|
| 42, 43 | Chrominance demodulator tubes | 6BY6. |
| 54 | Color reference oscillator tube | 6CB6. |
| 70 | Series phasing resistor | 6,800 ohms. |
| 71 | Bias resistor | 270 ohms. |
| 72 | Bypass capacitor | 1,000 mmf. |
| 84 | Series capacitor | 120 mmf. |
| 84′ | do | 330 mmf. |
| 85 | Shunt capacitor | 100 mmf. |
| 86 | Shielded cable distributed capacitance | 50 mmf. |
| 87 | Hue control potentiometer | 500 ohms. |
| 88 | Series resistor | 10 ohms. |
| 184 | Burst amplifier tube | p/s 6AN8. |
| 110 | Burst gating tube | t/s 6AN8. |

The invention claimed is:

1. In a color television receiver wherein a color image is reproduced in response to a received composite color television signal including a modulated color subcarrier conveying chrominance information, said signal also including periodically recurring color synchronizing bursts of oscillations of subcarrier frequency, the combination comprising means for receiving said composite color television signal, an oscillator for generating color reference oscillations having a frequency substantially equal to the frequency of said subcarrier, demodulating means coupled to said receiving means for recovering said chrominance information from said modulated subcarrier in response to the application thereto of said color reference oscillations, means coupled to said oscillator for applying said reference oscillations to said demodulating means, said applying means including a first parallel resonant circuit nominally tuned to said subcarrier frequency and comprising a first inductance across which said reference oscillations appear, means coupled to said receiving means for separating said color synchronizing bursts from said composite color television signals, means coupled to said burst separating means and to said oscillator for utilizing said separated bursts to synchronize the generation of said color reference oscillations therewith, said separated burst utilizing means including a second parallel resonant circuit nominally tuned to said subcarrier frequency and comprising a second inductance across which said burst oscillations appear, one of said first and second parallel resonant circuits also including a first capacitance and a second capacitance connected in series to form a series combination, said series combination being coupled in shunt with the inductance of said one resonant circuit, and means for shifting the phase of the oscillations appearing across the inductance of said one resonant circuit whereby to control the hue of the reproduced color image, said phase shifting means comprising resistance means connected in shunt with said second capacitance, and means for varying the effective resistance presented in shunt with said second capacitance by said resistance means.

2. Apparatus in accordance with claim 1 including a shielded cable comprising a conductor and an enclosing shield therefor, said second capacitance comprising the capacitance inherently exhibited by said shielded cable between said conductor and said shield, and wherein said resistance means comprises a resistor having a pair of end terminals, one of said end terminals being connected to said first capacitance by means of the conductor of said shielded cable, the other end terminal being directly connected to said shield and to a point of reference potential, and wherein said resistance varying means comprises a variable tap on said resistor directly connected to said other end terminal.

3. Apparatus in accordance with claim 2 wherein said series combination is coupled in shunt with the first inductance of said first parallel resonant circuit whereby adjustment of said variable tap effects the hue control of the reproduced color image via control of the phase of the color reference oscillations applied from said oscillator to said demodulating means.

4. Apparatus in accordance with claim 2 wherein said series combination is coupled in shunt with the second inductance of said second parallel resonant circuit whereby adjustment of said variable tap effects hue control of the reproduced color image via control of the phase of the burst oscillations utilized to synchronize the generation of the color reference oscillations by said oscillator.

5. Apparatus in accordance with claim 4 wherein said second capacitance also comprises a lumped capacitance connected between the conductor of said shielded cable and said point of reference potential.

References Cited in the file of this patent

UNITED STATES PATENTS

| | | |
|---|---|---|
| 2,122,653 | Levy | July 5, 1938 |
| 2,144,565 | Dreisbach | Jan. 17, 1939 |
| 2,234,461 | Tubbs | Mar. 11, 1941 |
| 2,436,129 | Weathers | Feb. 17, 1948 |